Jan. 20, 1953 R. BOLLING 2,626,341
BAKER'S OVEN
Filed Sept. 16, 1949
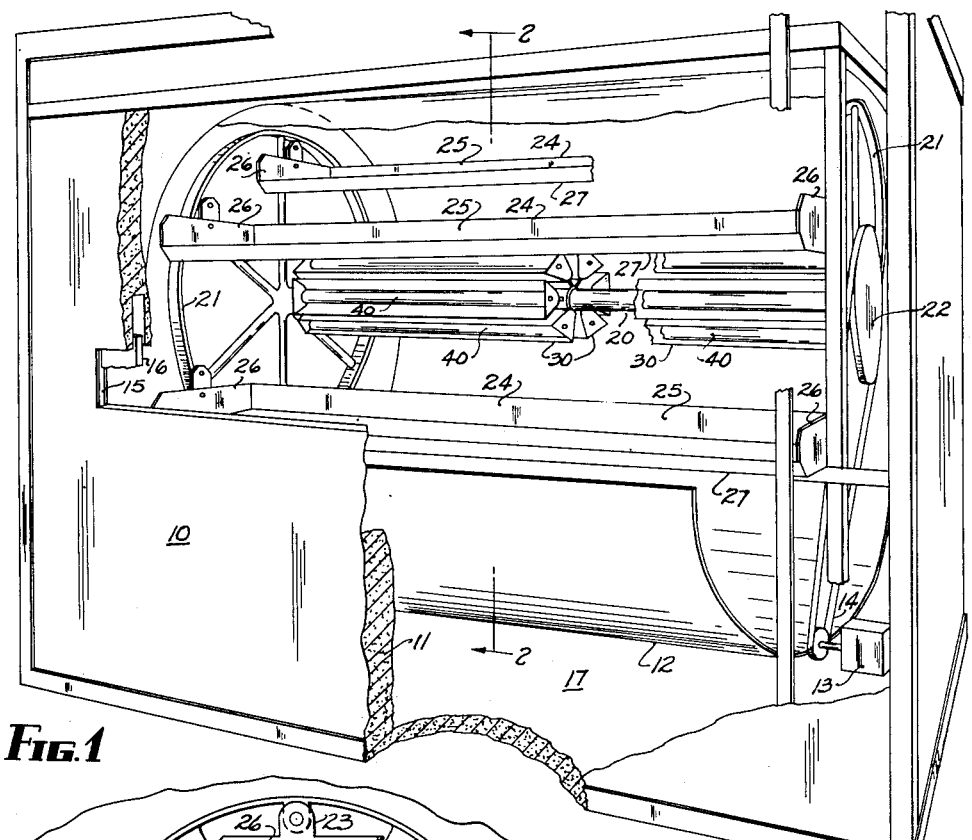
Fig.1
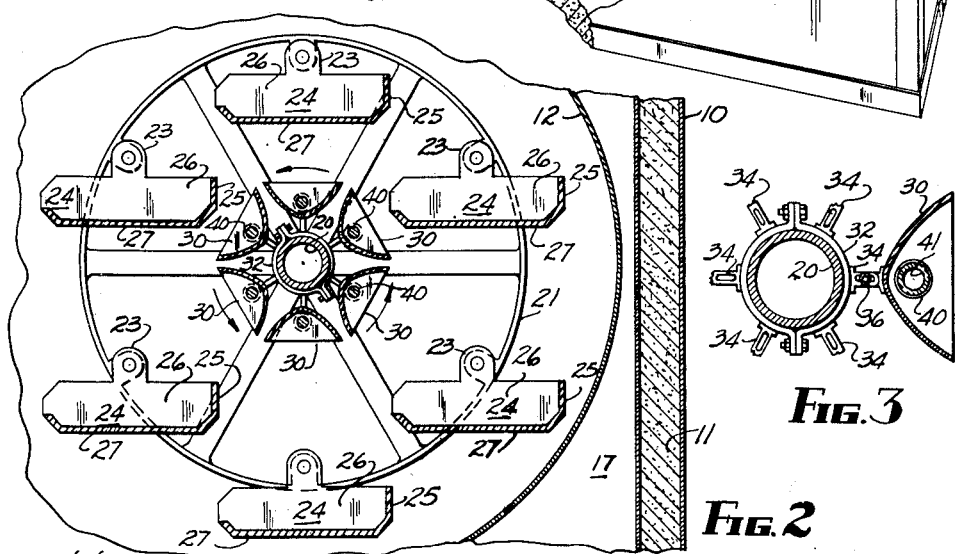
Fig.2
Fig.3
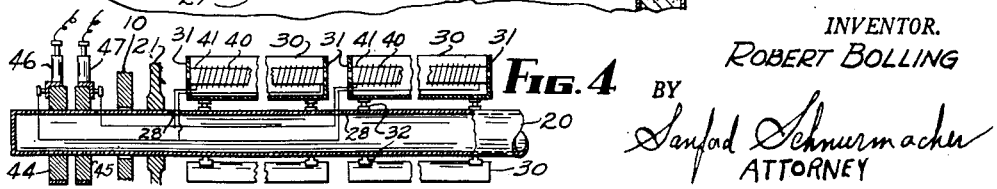
Fig.4
INVENTOR.
ROBERT BOLLING
BY
Sanford Schnurmacher
ATTORNEY Patented Jan. 20, 1953

2,626,341

UNITED STATES PATENT OFFICE 2,626,341

BAKER'S OVEN

Robert Bolling, Lakewood, Ohio

Application September 16, 1949, Serial No. 131,735

1 Claim. (Cl. 219—35)

This invention relates to bakers ovens and particularly to electrically heated reel ovens.

Conducive to a better understanding of this invention it may be well to point out that reel ovens are old in the art of baking. Furthermore, all types of fuels have been used to heat such ovens including wood, coal, gas, oil and electricity.

Electrical heating is the ideal method since it is easily controlled and produces no combustion products that have to be disposed of, as is the case with other fuels. However, the cost of heating such an oven by electricity is prohibitive if the baking is done by heated air in the conventional manner—the electrical heating elements merely being used as a substitute for other fuels to heat the oven atmosphere. This applicant has found that baking can be done efficiently and economically by electricity if the heat produced is focused directly on the object being baked and only incidentally used to heat the oven atmosphere.

The primary object of this invention, therefore, is to provide a reel oven that has a separate electric heating element associated with each tray.

Another object is to provide an oven of the type stated that has electric heating elements permanently focused and directed toward each tray whereby all sides of a loaf of bread or pastry resting thereon are uniformly heated during a single revolution of the tray.

A further object is to provide an electrically heated reel oven having focused heating elements mounted on a central shaft that rotates with the oven trays, whereby all the heat rays are directed toward the trays, thereby making for the most efficient utilization of the electric power used to energize the heating elements.

Still another object is to provide an electrically heated oven of the type stated that is compact in structure and free of dangerous combustion fumes in its operation, thereby making it economical to build and install, since it requires neither a high ceilinged room nor a special chimney.

These and other objects will become apparent from a reading of the following specification and claim together with the accompanying drawing wherein:

Figure 1 is a perspective view of a reel bakers oven made in accordance with this invention with a portion of the front broken away to show the relation of the various members;

Figure 2 is a vertical cross-sectional view of the oven taken approximately along the line and in the direction of the arrows 2—2 of the Figure 1;

Figure 3 is an enlarged end view partly in section of one of the heating elements and its mounting means; and Figure 4 is a front elevation of a portion of the hollow shaft and the heating units mounted thereon shown partly in section.

An oven 10 made in accordance with this invention is illustrated in the Figure 1. It consists of a double walled sheet metal box of suitable size having top, bottom and side walls with heat insulating material 11 between the walls. A longitudinally extending opening 15 having a vertically sliding door 16, provides entrance to the interior of the oven chamber 17.

Reference character 20 indicates a horizontally extending hollow shaft that is rotatably mounted within the oven chamber 17. Two large tray supporting wheels 21 are secured to either end of the shaft. One of the wheels has a coaxial pulley 22 mounted thereon that is connected to the motor 13 through a belt 14. Each wheel has inwardly extending spaced brackets 23 around the periphery thereof as shown in the Figure 3. The brackets of the two wheels 21 are aligned and the trays 24 are pivotally suspended from and between each pair of aligned brackets 23 as shown in the Figure 1.

The number of trays 24 is optional, being limited only by the space available in the chamber. In the preferred form of the oven shown, six trays are provided. Each tray 24 has a back wall 25, end walls 26 and a bottom 27. The trays are made of sheet metal which may be perforated for the easier passage of heat rays therethrough or they may be made of expanded metal mesh.

Each tray is pivotally suspended by its end walls 26 from and between the opposed brackets 23 of the wheels 21 as shown in the Figures 1 and 2. The bottom 27 of each suspended tray 25 will remain parallel with the base of the oven 10 as the wheels 21 and the shaft 20 rotate, since each tray 24 is suspended between the wheels 21 in the manner of the cars of a Ferris wheel.

A plurality of sheet metal reflectors 30 are mounted on the shaft 20 by means of the split collars 32. The reflectors 30 are preferably parabolic in cross section since that shape will project a straight beam of heat from a source of radiant energy located at the focal point of the reflector.

Each reflector extends longitudinally of the shaft 20 and parallel thereto, as shown in the Figures 1, 2, 3 and 4, and is directly mounted on the support arms 34 of the collar 32. The support arms 34 are made of two slotted telescoping halves that are adjustably locked in position by the means of a bolt 36 as shown in the Figure 3. Each reflector 30 is positioned so that it is permanently focused on a particular tray 24 as shown in the Figure 2. Instead of being a continuous unit, the reflector directed toward a particular tray may be formed of several aligned units as shown in the Figures 1 and 4. Each reflector has two refractory end plates 31 on which the heating elements 40 are mounted.

Each heating element 40 consists of a tube 41 made of refractory material on which resistance heating coils are wound. Each heating element 40 is mounted at the focal point of its parabolic reflector 30.

Reference characters 44 and 45 indicate insulated slip rings that are mounted on the hollow shaft 20 as shown in the Figure 4. These slip rings are connected to a source of electric power through brushes 46 and 47 that slidably engage the rings 44 and 45 respectively. Spaced holes 28 are located along the hollow shaft at the terminal point of each heating unit and the electrical lead wires from the heating elements 40 pass through the holes 28 into the interior of the hollow shaft and thence to the slip rings 44 and 45 as indicated in the Figure 4. The several heating units are connected in parallel or in series as determined by the voltages used and the temperature required.

A concave circular heat reflecting wall 12 made of highly polished sheet metal is mounted in the chamber 17. Its diameter being such that it will be cleared by the revolving trays 24.

In operating the oven, the loaves of bread or other articles to be baked are placed on the trays 24. The motor 13 is then started which causes the shaft and wheels 20 and 21 respectively to rotate. The heating elements 40 are then energized. As will be seen by the Figure 2 the heat from each heating element 40 is focused on a particular tray 24 by its reflector 30 and remains focused thereon at all times.

As the shaft rotates the trays 24 revolve exposing all sides thereof to the heat rays projected by the reflectors 30. The object to be baked is thus evenly heated on all its surfaces. It will be noted that each heating element 40 is closer to its associated tray 24 when the tray is at the peak of its travel than it is when at the lowest point. This assures that the bottom and top of the baked article will be uniformly and equally heated because the heat rays must pass through the bottom 27 of the tray 24 and also through a sheet of metal upon which the baked article usually rests when the tray is at the peak of its travel while the rays travel directly to the top of the article being baked when the tray is at the lowest point of its travel. This automatic change of distance between the baked goods and the heating element 40 prevents scorching or underbaking of the products. Heat rays that escape beyond the trays 24 are reflected back into the baking area by the concave wall 12, thereby increasing the efficiency of the oven.

The baking is done by both the radiant and infra-red rays produced by the heating element 40. These rays are projected directly against all sides of the article being baked by the parabolic reflector 30 as the tray 24 revolves. Heating of the air in the chamber 17 is only incidental and is not depended upon to do the baking. This direct utilization of the heat rays, without the intervening step of heating the atmosphere in the oven, makes it possible to use electricity for commercial baking in competition with cheaper but less efficient fuels.

Since the heating elements are mounted on the shaft 20 the oven height can be reduced, because no fire-box or heat duct need be located below the revolving trays, as is the case with other types of fuels. Neither is a chimney necessary in connection with this electrically heated oven. The oven is therefore adapted for use in buildings having standard ceilings and in neighborhoods where tall chimneys would be objectionable.

It will now be clear that there has been provided a device that accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

I claim:

A reel oven comprising in combination, a chamber, a rotating reel including a central axle and spaced end-wheels mounted within the said chamber, each of the said end-wheels having inwardly extending pivot-pins spaced around the periphery thereof, with their axes parallel to the said axle, the centers of the pivot-pins of one wheel being aligned with the centers of the correspondingly positioned pivot-pins of the opposite wheel; a plurality of baking trays suspended on and between the said paired pivot-pins parallel to the said axle, the said trays being free to turn on their respective pivot-pins under the action of gravity as the reel rotates; a plurality of longitudinally extending parabolic reflectors disposed axially and circumferentially on said axle, each of the said reflectors having a radiant heating element located at the focal point thereof, the focal point of each reflector being fixedly aligned with the projected center-line extending between the paired pivot-pins of the tray suspended immediately in front of it; and means for delivering electric current to the said radiant heaters during rotation of the reel.

ROBERT BOLLING.

REFERENCES CITED

The following references are of record in the file of this patent:

UNITED STATES PATENTS

| Number | Name | Date |
| --- | --- | --- |
| 1,378,080 | Woodson | May 17, 1921 |
| 1,476,215 | Pace | Dec. 4, 1923 |
| 1,762,035 | Soylian | June 3, 1930 |
| 1,880,822 | Cook et al. | Oct. 4, 1932 |
| 2,340,354 | Wells | Feb. 1, 1944 |
| 2,385,919 | Holm | Oct. 2, 1945 |
| 2,495,513 | Doyle | Jan. 24, 1950 |

FOREIGN PATENTS

| Number | Country | Date |
| --- | --- | --- |
| 227,184 | Great Britain | Jan. 9, 1925 |
| 505,682 | Germany | Aug. 1, 1928 |